Figure 1:
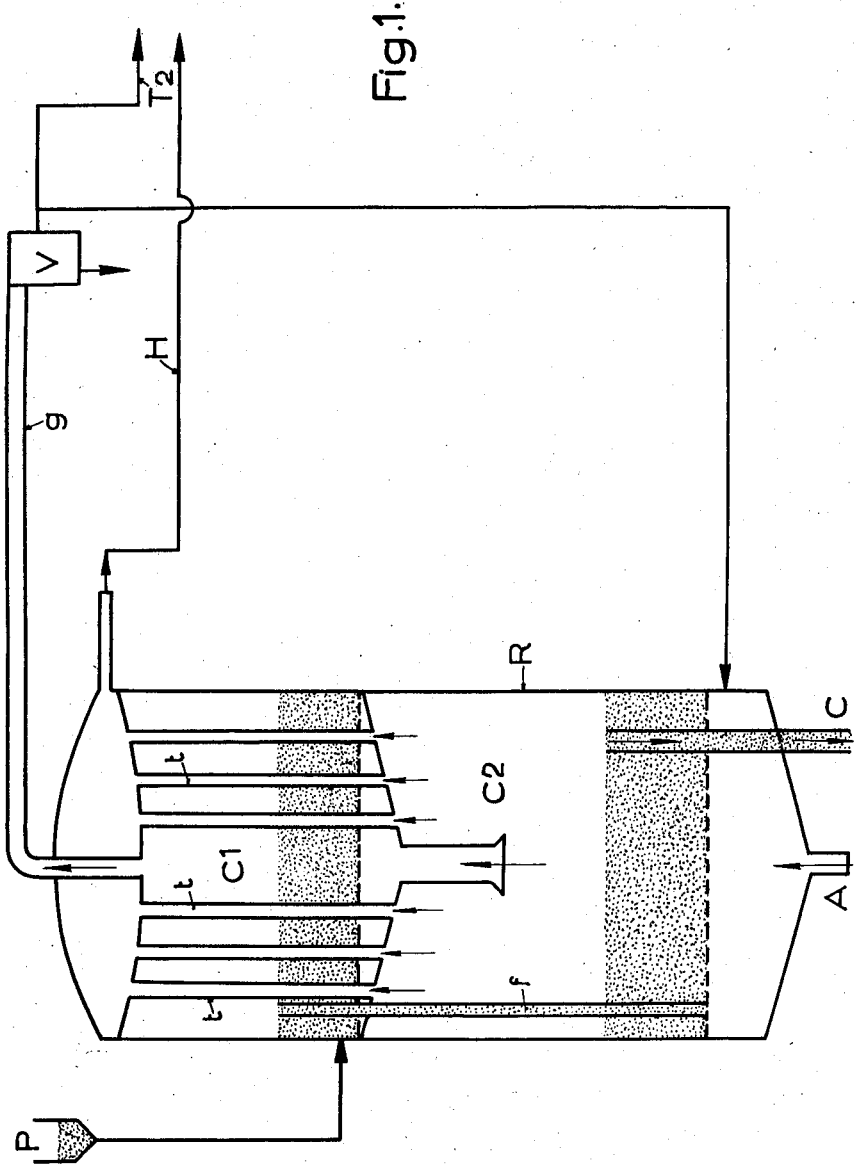

Aug. 12, 1958  A. V. ORTUNO ET AL  2,847,281
CONTINUOUS PROCESS FOR TREATING ARSENIC
AND SULFUR-CONTAINING ORE UNDER
FLUIDIZING CONDITIONS
Filed March 18, 1954  2 Sheets-Sheet 1

INVENTORS
*Angel Vian Ortuno*
*Conrado Iriarte Fernandez*
*Carlos Melches Serrano*
BY
*Curtis, Morris & Safford*
ATTORNEYS

2,847,281

CONTINUOUS PROCESS FOR TREATING ARSENIC AND SULFUR-CONTAINING ORE UNDER FLUIDIZING CONDITIONS

Angel Vian Ortuno, Conrado Iriarte Fernandez, and Carlos Melches Serrano, Madrid, Spain, assignors to Instituto Nacional de Industria, Madrid, Spain Application March 18, 1954, Serial No. 417,111

Claims priority, application Spain March 24, 1953

6 Claims. (Cl. 23—177)

Arsenopyrites have up to date been considered of a limited interest with regards to their exploitation, due to the fact that when roasted by conventional methods, they produce contaminated sulfurous gases containing arsenical compounds, which constitutes an inconvenience for their subsequent treatment. It is therefore that these gases, for example, could not be utilized for the production of sulfuric acid by catalytic contact, as the catalyst is poisoned by said arsenical compounds, until after a de-arsenication of the gases produced in the roasting furnaces. With regards to sulfuric acid obtained by the treatment thereof in chambers or towers, such acid has always been contaminated with arsenic, for it is impossible to remove the arsenic from these gases, as this requires a cooling of same, which is incompatible with a genuine performance of the Glover tower.

The present invention tends to overcome these difficulties by effecting de-arsenication in a stage prior to that of the roasting process, thereby obtaining during roasting, sulfur dioxide free of arsenical compounds, and these compounds as a by-product.

We have found that when arsenopyrite is heated in an atmosphere of sulfur dioxide, to about 500°–550° C., its arsenic contents are substantially volatilized, thus obtaining a distillate corresponding approximately to the formula $As_2S_2$, which is easily condensed, separated and purified.

It is also known that pyrites does not distil its labile sulfur in an appreciable manner, at temperatures below 700° C. It is therefore evident that de-arsenication of arsenopyrite can be carried out by means of an appropriate heat treatment, and that this treatment is by no means influenced by any other chemical actions that will reduce its sulfur contents in an appreciable manner.

In compliance with this invention, treatment of arsenopyrite ores is accomplished in two stages: (a) de-arsenication, and (b) roasting, which are carried out in accordance with a preferred process of this invention, in only one reactor, divided into two or more zones, so as to achieve the practical performance of the said procedures in each of these stages. The raw pyrite is introduced in the de-arsenication stage and establishes direct and indirect contact with the hot sulfurous gases from the roasting stage. The temperature and velocity of said gases are controlled in such a manner that distillation of the arsenic sulfide is accomplished without effecting that of the labile sulfur. The gases proceeding from this stage, essentially constituted by sulfur dioxide and nitrogen and arsenic sulfide, are eventually cooled off in order to separate the arsenical compounds, while the resultant gases can then be re-circulated, cold, when and where it is deemed convenient.

The pyrite, after its de-arsenication, passes on to the roasting stage, where it is roasted with air, oxygen or air enriched with oxygen. The gases leaving the roasting zone are divided into two streams, one of which is passed into the dearsenication zone for direct contact and heat exchange with the raw pyrite for removal of arsenic, while the other stream of gas is also utilized for heating, but by out-of-contact heat exchange, the raw pyrite in the dearsenication zone.

The method of the invention is illustrated in the accompanying drawing, wherein:

Figure 1 diagrammatically illustrates a two-stage method; and

Figure 2:
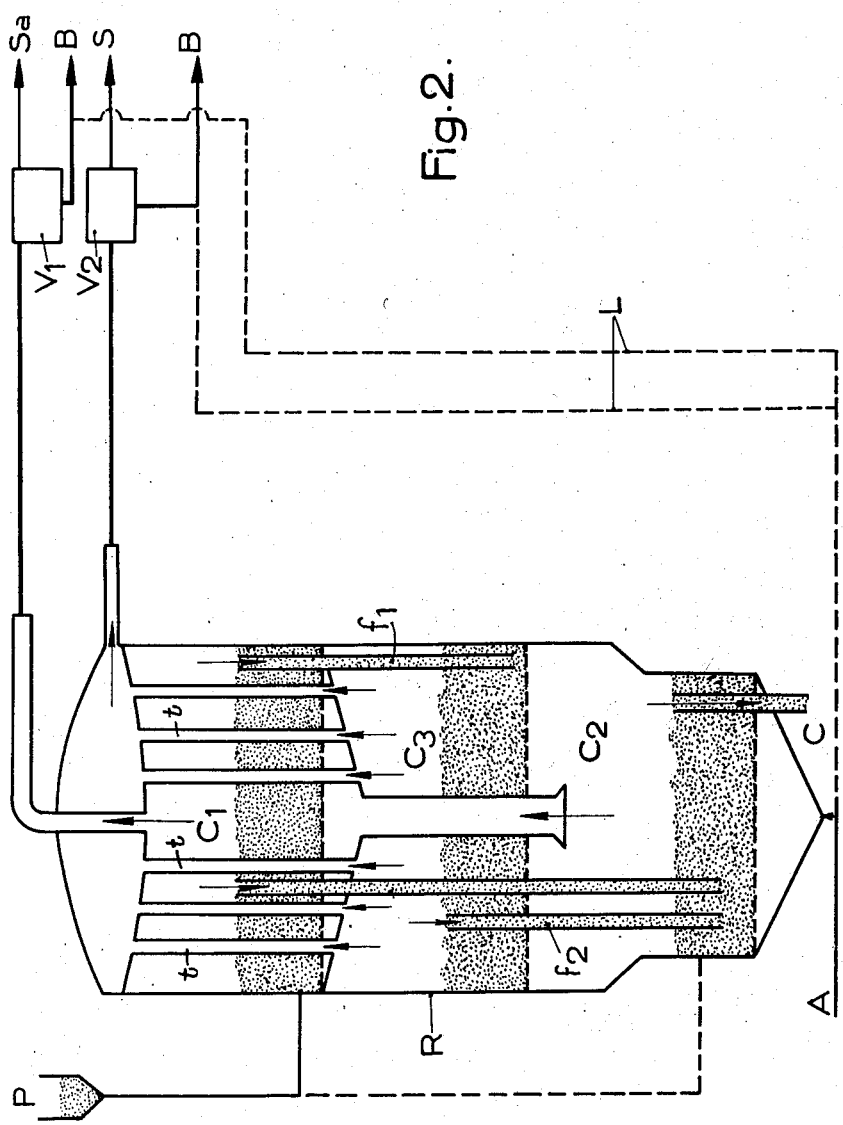

Figure 2 diagrammatically illustrates an embodiment of the method having three stages, an initial dearsenication stage, a final roasting stage and an intermediate distillation stage for the separate removal of labile sulfur.

The reactor zone in Figure 1 comprises two superimposed chambers $C^1$ and $C^2$. In the upper chamber $C^1$ is fed, through P, the load of fresh pyrites which is distributed around a bundle of heat exchanging tubes $t$.

In said Chamber $C^1$, the elimination of arsenic takes place under the action of sulfurous gases at high temperature of about 1000° C., which ascend from the lower chamber $C^2$, where the roasting of pyrites takes place, said pyrites having been subjected to de-arsenication and fed from the chamber $C^1$ through duct $f$.

The comburent, for instance air, is blown in at A. The spent pyrites are drawn off at C. Through the upper blow out pipe $g$ escapes a gaseous mixture of $SO_2$, nitrogen and arsenic sulfide, which is condensed at V.

Through $T_2$, sulfurous anhydride is sent to the circuit of utilization, for instance towards the catalytic treatment. Through duct H is drawn off $SO_2$ free from arsenic.

Each of these different zones can be subdivided, vary in its structure, or else can be arranged in separate apparatus. The practical performance is optimum, should the operation be carried out in a continuous manner. Any known technique can be applied for the solid-gas reactions, although the preferred embodiment of the present invention utilizes the so-called "fluidization" or turbulent layers.

There is no doubt in that the possibility of being able to exploit arsenopyrite ores economically, as disclosed above, is of great interest. However, this process might be interpreted in a restrictive sense for the invention, as same apparently merely relates to the production of sulfur dioxide, practically free of arsenic, obtaining this latter as a by-product, without, in the least, taking into account, the subsequent utilization of the calcines, while such utilization will undoubtedly have to be conditioned in accordance with the residual contents of arsenic in said calcines. Naturally, these contents are only slight, due to the characteristics of the treatment disclosed in the said invention; however, in certain cases the arsenic contents may prove intolerable for a calcine utilization as a charge in a blast furnace, even when such pyritic calcines are mixed with iron ore of an appropriate composition. Thus, in order to be able to utilize pyritic calcine (purple pyrite) in siderurgy, apart from other conditions, it is absolutely necessary, that the arsenic contents do not exceed a 0.02% of their total weight. Consequently, whenever pyrites are to be exploited, including pyrites with low arsenic contents (less than a 0.3%), and a subsequent siderurgical exploitation of the calcines is desired, then provision will have to be made for an almost exhaustive de-arsenication of such calcine, even though the less fixed products (sulfur-sulfur dioxide), that issue from the furnace, are contaminated to the maximum by this substance, either in the form of $As_2S_2$, or as $As_2O_3$, which, naturally, depends upon the conditions in which roasting is carried out, i. e. temperature, composition and proportion of comburent, residence time, etc. This contamination is preferable to the production of calcines that are unprofitable in a blast furnace, as a purification of such products is easier to accomplish, than that of the calcines.

On the other hand, it has now been assured that when roasting pyrites, including pyrites with low arsenic contents (less than 0.3%), and more so when dealing with arsenopyrite (having more than approximately 1.5% of arsenic contents), by means of the turbulent layers or fluidization system—the preferred technique of the present invention—that then the larger portion of the arsenic initially contained in said pyrite remains in the calcines, so that said calcines are thus rendered unprofitable for subsequent sidelurgical purposes (percent As > 0.02). This is due to the fact that under the operating conditions (high temperature of the roasting bed, close solid-gas contact, etc.), a fixed $As_2O_5$ is formed which does not volatilize, but immediately reacts with the calcine, thus producing a fixed, stable and infusible iron arsenate. The only procedure proposed to overcome these drawbacks, thereby enabling a subsequent siderurgical exploitation of the calcines, has been, to again utilize the classical multiple hearth furnace, at least during a first stage of the roasting process so that, after having accomplished therein a complete de-arsenication of the solid phase, to effect, successively and by the turbulent layers system, a dead roasting of the residue. This arbitrary situation, cannot be considered entirely satisfactory, having been accepted "a fortiori" in the absence of a more genuine procedure; this being proved by the fact that the only patents claiming same, are related to the exploitation of arsenopyrite ores containing gold, so that the procedure cannot in the least be considered original with regards to the specific exploitation of gold, this self-limitation being ascribed by those who disclose same, to the fact that it is the gold itself which appraises the calcine to such an extent as to render the procedure profitable.

The present invention, however, has the advantage of being applicable, without any limitations of this kind, even when it is desired to obtain calcines substantially free of arsenic (percent of As less than 0.02), from pyritic ores containing arsenic in any proportion. It will suffice to raise the temperature of the de-arsenication zone or compartment, even though this should cause the concurrent elimination of labile sulfur (in amounts that increase in direct proportion to the temperature applied thereto); so that the solid residue, after having been roasted, has an arsenic content that is compatible with the subsequent treatment to be applied to the calcines.

In fact, we have found that when de-arsenication is carried out at temperatures higher than 650° C., the tolerable minimum of arsenic to which reference has been made heretofore, can be achieved with appropriate grain sizes and gas velocities.

The present invention relates also to the production of sulfur dioxide and elemental sulfur, both practically free of arsenical compounds, and these compounds as a by-product, from arsenopyrite ores. To this effect the arsenopyrite ores are submitted to a treatment which, in compliance with a preferred method of this invention, is carried out in one only reactor, divided into three or more zones; said treatment comprising three stages, i. e. (a) dearsenication, (b) distillation of the labile sulfur, and (c) roasting.

The raw pyrite is introduced in the de-arsenication stage, thus establishing a direct contact with a part of the hot sulfurous gases from the roasting stage and, if desired, an out-of-contact heat exchange with the hot gases from the distillation stage. The temperature and velocity of said gases are controlled in such a manner as to achieve the separation of the arsenic without effecting that of the labile sulfur in this stage. The gases proceeding from this de-arsenication stage, essentially constituted by sulfur dioxide, are eventually cooled off in order to separate the arsenical compounds, while the remaining gases can then be re-circulated, where and when it is deemed convenient. The solid residue, in part passes towards the distillation zone for the labile sulfur where it establishes contact with that portion of the gases that leaves the roasting stage and does not pass directly to the de-arsenication stage; the proportion being appropriately controlled so as to accomplish distillation of the labile sulfur. The resultant gases from this stage, upon leaving the distillation zone, can be utilized for out-of-contact heating of the raw pyrite in the de-arsenication stage, as also eventually, for a re-circulation thereof, after condensing the sulfur. The solid residue from the distillation stage, substantially constituted by $Fe_7S_8$, passes on to the roasting stage together with a part of the solid residue directly from the de-arsenication stage, so as to effect a self-roasting, while being roasted with a controlled amount of air, oxygen or air enriched with oxygen, whereas the resultant gases are essentially, as already stated, utilized in the de-arsenication and in part in the distillation processes.

The performance of the operation is shown, by way of illustration, in the diagram Figure 2 of the accompanying drawing. As in the former figure: R designates the reactor and P the load of fresh pyrites; A is the inlet of comburent such as air and C the outlet of residue; $t$ is the bundle of heat exchanging tubes.

The reactor R is here divided into three superimposed chambers: $C^1$ the de-arsenication chamber, $C^3$ the distillation chamber, and $C^2$ the roasting chamber. $V_1$ and $V_2$ are condensation chambers; $Sa$ the outlet for arsenic; S the outlet for sulfur and B the outlet for sulfurous anhydrid. The pyrite, after having been treated in chamber $C^1$, is discharged into chamber $C^3$ through a duct $f^1$ and therefrom into chamber $C^2$ through a duct $f^2$. The regulation of the gases is carried out through the circuit L.

Each of these different zones can be subdivided, varied in structure, or be arranged in separate apparatus. The practical performance is optimum, should the operation be carried out in a continuous manner. Any known technique can be applied for the gas-solid reactions, although the preferred embodiment of the present invention employs, as above stated, the so-called fluidization or turbulent layers.

Having now particularly described and ascertained the nature of the present invention and in what manner it is to be performed, it should be stressed that the aforementioned embodiments admit modifications in detail without departing from the scope or spirit of the invention as defined in the appended claims.

We claim:

1. A continuous process for treating arsenic and sulfur-containing ore under fluidizing conditions in at least two treatment zones which comprises continuously feeding said ore to the first zone; dividing hot sulfur dioxide gas from the last zone into first and second streams; passing the first of said streams of hot sulfur dioxide gas in out-of-contact heat exchange with the ore in the first zone for heating said ore without contaminating said stream of gas with arsenic and separately withdrawing said arsenic-free sulfur dioxide gas; passing the second of said streams of hot sulfur dioxide gas from the last zone through and in direct contact with the ore in the first zone, said sulfur dioxide gas being introduced at a velocity sufficient to maintain the ore in fluidized condition and being at a temperature sufficient to volatilize the arsenic content of the ore as arsenic sulfide but not the labile sulfur of the ore; separately and continuously withdrawing the resulting arsenic sulfide containing sulfur dioxide gas; continuously transferring a substantially arsenic-free ore residuum from the first zone to the last zone, thereby maintaining a substantially constant amount of fluidized ore and arsenic-free residuum under treatment in the first zone and feeding said ore residuum to the last zone; continuously passing an oxygen-containing gas upwardly through and in direct contact with the arsenic-free ore residuum in the last zone for oxidizing sulfur therein and at a velocity sufficient to maintain the ore residuum in said last zone in fluidized condition, the amount of oxygen in said last-mentioned gas being sufficient for supporting combustion and thereby forming hot sulfur dioxide gas; and continuously withdrawing desulfurized and arsenic-free ore residuum from the last zone.

2. Process defined in claim 1 wherein the stream of hot sulfur dioxide gas passed in out-of-contact heat exchange with the ore in the first treatment zone and separately withdrawn therefrom is recycled to the last zone for controlling the temperature therein.

3. Process defined in claim 1 wherein the arsenic sulfide-containing sulfur dioxide gas separately withdrawn from the first zone is cooled for condensing the arsenic sulfide therein and a portion of the remaining gas thus freed from arsenic is recycled for controlling the temperature in at least one of the zones.

4. Process defined in claim 1 wherein all the substantially arsenic-free ore residuum in the first zone is transferred directly to the last zone.

5. Process defined in claim 1 wherein a portion of the substantially arsenic-free ore residuum in the first zone is transferred to an intermediate zone and said first stream of hot sulfur dioxide gas from the last zone is continuously passed upwardly through and in direct contact with the ore residuum in said intermediate zone for volatilizing labile sulfur therefrom before said first stream is passed through the first zone for out-of-contact heat exchange with the ore in the first treatment zone.

6. Process defined in claim 5 wherein the portion of the ore residuum transferred from the first zone to the intermediate zone is fed to the last zone after removal of the labile sulfur therein and the remainder of the ore residuum is transferred directly from the first zone to the last zone.

References Cited in the file of this patent

UNITED STATES PATENTS

| | | |
|---|---|---|
| 1,606,343 | Burdick | Nov. 9, 1926 |
| 2,238,194 | Tainton | Apr. 15, 1941 |
| 2,600,351 | Wells | June 10, 1952 |
| 2,650,159 | Tarr et al. | Aug. 25, 1953 |